United States Patent [19]

Norris et al.

[11] Patent Number: 4,747,728

[45] Date of Patent: May 31, 1988

[54] METHOD FOR DISTRIBUTING AN AQUEOUS SOLUTION CONTAINING A PEROXYGEN IN CLAY

[75] Inventors: Robert D. Norris, East Windsor; Richard A. Brown, Lawrenceville; Joseph C. Richards, Robbinsville, all of N.J.

[73] Assignee: International Technology Corporation, Torrence, Calif.

[21] Appl. No.: 900,048

[22] Filed: Aug. 25, 1986

[51] Int. Cl.$^4$ ................................................ E02D 3/12
[52] U.S. Cl. ..................................... 405/263; 166/308; 252/8.551
[58] Field of Search ............... 405/263, 264, 266; 106/286.1, 286.7, 287.32; 166/305.1, 307, 308; 252/8.551

[56] References Cited

U.S. PATENT DOCUMENTS

| | | | |
|---|---|---|---|
| 2,899,329 | 8/1959 | Lyons | 106/287 |
| 2,899,330 | 8/1959 | Lyons | 106/287 |
| 3,024,191 | 3/1962 | Jones | 252/8.55 |
| 3,058,909 | 10/1962 | Kern | 252/8.55 |
| 3,349,032 | 10/1967 | Krieg | 252/8.55 |
| 3,808,128 | 4/1974 | Heckman | 405/263 X |
| 3,896,879 | 7/1975 | Sareen et al. | 166/308 |
| 4,366,071 | 12/1982 | McLaughlin et al. | 252/8.55 R |
| 4,374,739 | 2/1983 | McLaughlin et al. | 252/8.55 R |
| 4,460,483 | 7/1984 | Weaver | 252/8.55 R |
| 4,464,268 | 8/1984 | Schievelbein | 252/8.55 B |
| 4,492,494 | 1/1985 | Szekely et al. | 405/264 |
| 4,505,833 | 3/1985 | Lipowski et al. | 252/8.5 C |
| 4,536,305 | 8/1985 | Borchardt et al. | 252/8.55 R |
| 4,588,506 | 5/1986 | Raymond et al. | 210/606 |

OTHER PUBLICATIONS

Freeze et al., *Groundwater*, Prentice-Hall, Inc., Englewood Cliffs, N.J., (1979), pp. 26 to 30.
Hillel, D., *Soil and Water*, Academic Press, New York, (1971), pp. 12 to 21.

Primary Examiner—David H. Corbin
Attorney, Agent, or Firm—Luedeka, Hodges & Neely

[57] ABSTRACT

The present invention is a method for distributing a colloid-free, aqueous solution containing a peroxygen compound in a particulate matter containing clay without causing the clay to swell. It has been found that hydrogen peroxide alone causes swelling of clays. It is well-known that monovalent ions cause clays to disperse and swell. It is unexpected to find that perborate and persulfate anions do not cause clays to swell, even in the presence of sodium ions. The process is useful for enhancing the biodegradation of contaminants in clayey soils or for winning mineral values from clayey ore deposits.

17 Claims, No Drawings

METHOD FOR DISTRIBUTING AN AQUEOUS SOLUTION CONTAINING A PEROXYGEN IN CLAY

The present invention is a method for distributing an aqueous solution containing a peroxygen in soils and other particulate matter containing clay, without the clay swelling.

Clays can reduce permeability of particulate matter by swelling or migrating to form bridges or blockages. Swelling occurs when aqueous fluids come in contact with the clays. Swelling clays are commonly encountered in soils, in geological formations and in ores. High swelling clays used in drilling fluids may also invade a permeable formation during drilling to create low permeability zone in the vicinity of the borehole. Clays in ores reduce the permeability of the ores and adversely affect the recovery of mineral values during heap leaching and in situ mining. Clays in soils prevent the even distribution of an aqueous solution employed to accelerate the biodegradation of contaminants by providing oxygen and nutrients to microorganisms in the soil.

It is frequently desirable to employ an aqueous solution to provide oxygen to accelerate chemical and biochemical reactions. However, oxygen has a limited solubility in water. Usually the lack of oxygen serves to limit the biooxidation rate. As a consequence, there is frequently a need to increase the oxygen available in the aqueous solution. Hydrogen peroxide is employed as a source of added oxygen to stimulate aerobic microorganisms to biooxidize contaminants in soil according to U.S. Pat. No. 4,588,506 to Raymond et al. Hydrogen peroxide has also been used as a source of oxygen for heap leaching of ores and for in situ leaching of metals.

Hydrogen peroxide and other peroxygens have been widely used as breakers for colloids employed in viscous fluids used for tertiary petroleum recovery, for fracing and for other well completion operations. In these operations the viscosity of the fluid is increased to avoid distributing the fluid uniformly throughout the formation, but instead to confine the fluid into discrete channels.

Similarly, U.S. Pat. No. 3,896,879 to Sareen teaches that hydrogen peroxide can be employed as a pretreatment to stimulate the production of minerals from rock formations. The patent teaches that hydrogen peroxide is useful because it penetrates the smallest fractures in a nonplastic rock and flows into a formation. There the hydrogen peroxide decomposes to form oxygen gas which generates the pressure necessary to increase the size of the fissures to permit the leachant to contact the minerals.

U.S. Pat. No. 3,024,191 to Jones teaches that a perborate is particularly useful as a breaker for hydraulic fracturing fluids containing carboxymethylcellulose. A sodium or a potassium perborate is preferred but any water soluble source of the perborate radical may be employed. When used as a breaker with all other organic colloids perborate resulted in a voluminous precipitate of solids capable of impairing the porosity of a formation.

U.S. Pat. No. 3,058,909 teaches that the borate ion generally increases the viscosity of an organic colloid such as guar gums and other compounds employed in fracturing formations. This teaching appears to explain the precipitates disclosed in U.S. Pat. No. 3,024,191 when perborate was employed as a breaker with organic colloids in general.

Hydrogen peroxide itself increases the swelling of clays. This property of hydrogen peroxide may explain the absence of teachings in the prior art suggesting hydrogen peroxide as a lixivant for plastic formations such as those containing clay.

Clays are known to be widely distributed and often found with particulate matter such as mineral deposits and soils. Consequently, the prior art reports there have been numerous attempts to control the ill effects of water on clay and/or other fines, principally by the oil industry. One idea is to convert the clay from the swelling form to another cation form which does not swell as much.

Cations that form relatively nonswelling clays are potassium, calcium, ammonium and hydrogen ions. When a solution of these cations, mixed or individually, flows past a clay mineral, they readily replace the sodium ion and the clay is transformed to a nonswelling form. The exchange of acid, potassium, calcium, or ammonium ions for sodium ions has been successful in preventing damage to formations susceptible to plugging or disintegrating due to clays in their compositions. While success has been achieved with this method, the exchanging of the other ions for ions in the clays is only a temporary remedy in that counter-replacement can readily take place according to the teaching of U.S. Pat. No. 4,536,305.

The present invention is a process for distributing a colloid-free, aqueous solution containing a peroxygen compound through particulate matter containing clay without swelling the clay. The process comprising incorporating a compound selected from the group consisting of salts of a perborate or a persulfate anion into water to form an aqueous solution and introducing the aqueous solution into the particulate matter containing clay.

No explanation is known for the unexpected discovery that a perborate or a persulfate anion can prevent or minimize the swelling of clay.

Those skilled in the art will recognize that alternative names are used for the compounds employed in the present invention. For example, the perborate anion or radical is also called peroxyborate. Similarly, the persulfate anion is also called perdisulfate, peroxydisulfate and dipersulfate. In addition, potassium persulfate is sometimes called Marshall's Salt.

One preferred embodiment of the present invention is the use of a perborate or a persulfate as a source of oxygen for aerobic microorganisms in the soil to stimulate the biodegradation of a contaminant such as a petroleum product without swelling the clay. For example, potassium (or sodium) perborate can be incorporated into an aqueous solution, as a preformed salt, or formed in the solution by incorporating hydrogen peroxide, boric acid and potassium (or sodium) hydroxide (or carbonate). Similarly, potassium (or sodium) persulfate may be incorporated as a preformed salt or formed in situ by incorporating ammonium persulfate and potassium (or sodium) hydroxide and allowing at least part of the ammonia to escape from the solution. Optionally, other additives such as nutrients may be added to the aqueous solution to further stimulate the microorganisms. Suitable aerobic microorganisms are usually present in soils in sufficient numbers to biooxidize the contaminant; however, the soil may optionally be inoculated with additional microorganisms.

In another preferred embodiment, the particulate matter containing clay is an ore heap. The aqueous solution containing a perborate or persulfate is employed as a lixivant to oxidize and extract mineral values from the ore. Optionally, other additives such as chelating agents or surfactants may be employed to increase the solubility of the mineral values in the lixivant or the wetting of the ore.

In a similar preferred embodiment the particulate matter containing clay is a granular mineral deposit which is to be solution mined.

Cations are known to affect the collodial properties of clay according to Hillel, D., Soils and Water, *Physical Principles and Processes*, Academic Press, N.Y. (1971). The reference discloses that cations are attracted to the collodial clay particles, and on the other hand anions are repelled by the particles and are not generally recognized to affect the collodial properties. The relative effect of cations on clays is Al>Ca>Mg>K>Na>Li. Polyvalent ions such as Al, Ca and Mg flocculate the clay colloids while monovalent ions such as Na and Li disperse the clay as a sol and cause swelling.

The teaching of the Hillel reference clearly suggests that a potassium ion is preferable to a sodium ion for a perborate or persulfate used in the present invention. Further, one skilled in the art will recognize that the improved permeability of the clays may be maintained or stabilized by incorporating a polyvalent ion or a potassium ion.

The best mode of practicing the present invention will be clear to one skilled in the art from the following nonlimiting examples.

In the examples, the Flow Rate, expressed in minutes, is employed as an index of the permeability of the particulate matter containing clay. The data is reported cumulatively, that is, the total elapsed time required to collect the total volume.

Permeability was measured as the rate of flow of an aqueous solution through soil samples placed in a filter press and mud cell assembly. The assembly consisted of a hollow metal cylinder 7.6 cm in diameter. The cylinder had a top which could be secured to maintain a pressure. A metal screen was positioned in the bottom of the cylinder above a drain hole. A piece of 50 hardness Whatman filter paper was placed on the screen. Approximately fifty grams of clayey soil slurried with 100 ml of test solution was then placed on top of the filter paper. The top of the apparatus was then placed on the apparatus and the system pressurized to the pressures indicated in the data tables. Water was collected in graduated cylinders and the times to collect specific volumes recorded. The specific conditions for each experiment are recorded in the data tables. In each experiment the slurry was adjusted to pH 6.8 (or as stated) with HCl.

EXAMPLE 1

Three clay samples were prepared as described above. Two (A and B) were slurried with 1.0 g/l sodium perborate monohydrate (NaPB) solution and one was slurried with deionized water. As reported in Table I, the permeabilities of the perborate solutions were much higher than the water solution. The Flow Rate was generally three to five times faster with the perborate solutions.

EXAMPLE 2

The test was repeated using fresh soil samples. In this experiment, the soil was leached twice more with 100 ml of the same solutions. As shown in Table II, the Flow Rate was greater with the perborate solution than with deionized water. The difference in permeability was somewhat less than in the first experiment. The effectiveness of the perborate solution increased with successive volumes of water passed through the soil. The example shows the effect increases with successive applications of perborate.

EXAMPLE 3

Two soil samples which had been leached with water or perborate solution as reported in Table II were then leached with the other fluid. As shown in Table III, the Flow Rate was initially faster in the sample being leached with water. As the leaching proceeded, the perborate solution leaching rate became greater than the water leaching rate. This demonstrates that the observed differences in flow rates is due to the composition of the solutions.

EXAMPLE 4

An experiment was conducted to determine whether the effect is a result of the perborate ion, hydrogen peroxide, or the borate ion. The results of this experiment are shown in Tables IV and V. The solution with sodium borate (NaB) alone leached very slowly, probably because the borate ion alone had little effect and the sodium ion is known to cause swelling of clays. The combination of hydrogen peroxide and perborate was much better than the borate alone, but not as good as either of the perborate solutions. Table V shows that hydrogen peroxide (HP) alone is worse than water. Therefore, it may be concluded that the perborate itself is the active agent. The effect of borate/hydrogen peroxide solutions (NaB/HP) compared to water alone is attributed to the in situ formation of perborate. The conclusion that perborate is the active agent is borne out by noting that the monohydrate solution leached faster than the tetrahydrate solution.

EXAMPLE 5

The prior examples suggested that the equilibrium between perborate and borate/hydrogen peroxide plays an important role. This hypothesis was tested by aging solutions of sodium perborate monohydrate, sodium perborate tetrahydrate and a mixed solution of sodium borate and hydrogen peroxide. Upon standing the perborate solutions are known to hydrolize to give increasing amounts of sodium borate and hydrogen peroxide. The results are shown in Table VI. The monohydrate appeared to be superior. These results suggest that the perborate ion is the functional moiety.

EXAMPLE 6

The effectiveness of both sodium persulfate (NaPS) and potassium persulfate (KPS) were also evaluated as shown in Table VII. In this experiment soil samples were leached with 100 ml of water or peroxygen solution, then 100 ml of water and finally 100 ml of the initial fluid. All peroxygen solutions leached faster than the deionized water. The difference between deionized water and the peroxygen solutions increased with increasing volumes collected over the first 100 ml. The effect of sodium persulfate and the sodium perborate dissipated rapidly during the deionized water cycle, but remained strong for the potassium persulfate treated soil. During the third phase of the experiment the difference between the peroxygen solutions and the water solution became very large. In the first two phases of the experiment the potassium persulfate performed much better than the other two peroxygens. Since potassium and sodium persulfates dissociate rapidly in water to the persulfate anion and the alkali metal cation, these results indicate a very negative effect of the sodium ion, a well-known phenomenon. This suggests that potassium perborate monohydrate could be even more effective.

EXAMPLE 7

Not all peroxygens improved the permeability of clayey soils. As previously discussed, hydrogen peroxide had a negative effect. Table VIII shows that potassium peroxydiphosphate (KPOP) was not effective. Visual observation of clay slurries with hydrogen peroxide, peroxydiphosphate, peroxydisulfate, peroxymonosulfate, and perborate showed that the perborate slurries were different in appearance and filtered much more rapidly, indicating an increased permeability of the clay.

EXAMPLE 8

Table IX shows the effect of varying pH and perborate concentration at constant pressure. This data indicates that very high levels of perborate can be detrimental, probably because there is a level at which additional perborate ion is no longer beneficial while the detrimental effect of added sodium becomes dominant. The data also shows that pH has an effect, but the optimum pH is dependent on the sodium perborate concentration.

EXAMPLE 9

Additional tests were conducted using a clayey soil from another site. This soil, as reported in Table X, showed a negative effect of added perborate. However, when the experiments were repeated using the new soil but with lower levels of perborate, a modest benefit to perborate addition was observed as shown in Table XI. However, the teachings of the prior art would find this modest benefit to be very surprising in view of the known effect of the sodium ion.

Further, in view of the demonstrated effect of hydrogen peroxide on clay it is unexpected that even a modest benefit would be observed.

TABLE I

Effect of Sodium Perborate on Permeability

| Volume (ml) | Min. Flow Rate at 552 kPa | | |
|---|---|---|---|
| | Water | 1 g/l NaPB | |
| | | A | B |
| 25 | 5.66 | 1.32 | 1.83 |
| 50 | 15.23 | 3.42 | 4.87 |
| 75 | 24.00 | 5.78 | 8.20 |
| 100 | 36.42 | 8.33 | 12.63 |

TABLE II

Comparison of Sodium Perborate and Water

| Volume (ml) | Min. Flow Rate at 552 kPa | |
|---|---|---|
| | Water | 1 g/l NaPB |
| 25 | 2.08 | 1.05 |
| 50 | 7.50 | 3.50 |
| 75 | 15.43 | 7.75 |
| 100 | 22.92 | 12.07 |
| 125 | 36.44 | 15.32 |
| 150 | 50.10 | 19.90 |
| 175 | 61.2 | 24.40 |
| 200 | 76.20 | 29.85 |
| 225 | 94.07 | 32.20 |
| 250 | 112.22 | 34.82 |
| 275 | 130.15 | 37.70 |
| 300 | 151.32 | 40.57 |

TABLE III

Switch Treatment Between Water and NaPB

| Volume (ml) | Min. Flow Rate at 552 kPa | |
|---|---|---|
| | Water after NaPB | NaPB after Water |
| 25 | 3.97 | 6.80 |
| 50 | 11.92 | 13.42 |
| 75 | 24.48 | 22.05 |
| 100 | 38.75 | 30.35 |

TABLE IV

Comparison of Sodium Borate, Sodium Perborate (mono and tetrahydrate), and a Mixture of Sodium Borate and Hydrogen Peroxide

| Volume (ml) | Min. Flow Rate at 552 kPa | | | |
|---|---|---|---|---|
| | Sodium Metaborate | NaPB Mono | NaPB Tetra | NaB/HP |
| 25 | 10.12 | 0.58 | 1.10 | 1.37 |
| 50 | 40.84 | 2.08 | 3.73 | 4.70 |
| 75 | 91.90 | 3.96 | 7.62 | 9.65 |
| 100 | 147.80 | 6.57 | 11.18 | 14.32 |
| 125 | NM | 9.49 | 17.29 | 23.28 |
| 150 | NM | 16.70 | 26.08 | 35.67 |
| 175 | NM | 26.37 | 35.33 | 49.72 |
| 200 | NM | 35.07 | 43.40 | 61.84 |

TABLE V

Comparison of Perborate and Hydrogen Peroxide Solutions

| Volume (ml) | Min. Flow Rate at 552 kPa | | |
|---|---|---|---|
| | NaPB mono | $H_2O_2$ (1000 ppm) | Water |
| 25 | 5.43 | 11.02 | 8.32 |
| 50 | 16.36 | 29.21 | 21.33 |
| 75 | 33.03 | 57.23 | 39.09 |
| 100 | 51.42 | 90.06 | 60.06 |

TABLE VI

Effect Aging Perborate and Borate/Hydrogen Peroxide Solutions

| Volume (ml) | Min. Flow Rate at 552 kPa | | |
|---|---|---|---|
| | NaPB mono | NaPB Tetra | NaB/HP |
| 25 | 1.02 | 1.50 | 1.62 |
| 50 | 3.35 | 4.93 | 4.96 |
| 75 | 7.20 | 10.78 | 10.80 |
| 100 | 11.63 | 16.56 | 16.56 |

TABLE VII

Comparison of Sodium Perborate, Potassium and Sodium Persulfate, and Water

| Volume (ml) | Min. Flow Rate at 552 kPa | | | |
|---|---|---|---|---|
| | Water | NaPS | KPS | NaPB |
| Reagent | | | | |

TABLE VII-continued

Comparison of Sodium Perborate, Potassium and Sodium Persulfate, and Water

| Volume (ml) | Min. Flow Rate at 552 kPa | | | |
|---|---|---|---|---|
| | Water | NaPS | KPS | NaPB |
| 25 | 2.52 | 2.28 | 1.62 | 2.27 |
| 50 | 7.80 | 7.05 | 5.13 | 7.55 |
| 75 | 16.65 | 14.23 | 9.73 | 15.88 |
| 100 | 27.15 | 20.43 | 14.93 | 23.60 |
| Water | | | | |
| 125 | 42.05 | 32.68 | 19.86 | 35.35 |
| 150 | 59.82 | 49.45 | 26.26 | 53.06 |
| 175 | 77.73 | 67.76 | 47.91 | 73.03 |
| 200 | 97.13 | 85.11 | 38.49 | 92.53 |
| Reagent | | | | |
| 225 | 124.86 | 86.06 | 40.19 | 94.63 |
| 250 | 150.78 | 87.19 | 41.66 | 97.09 |
| 275 | | 88.79 | 43.27 | 99.96 |
| 300 | | 89.39 | 45.02 | 102.82 |

TABLE VIII

Comparison of Sodium Perborate, Potassium Persulfate, and Potassium Perphosphate

| Volume (ml) | Min. Flow Rate at 552 kPa | | |
|---|---|---|---|
| | NaPB | KPS | KPOP |
| 25 | 0.63 | 1.08 | 5.02 |
| 50 | 2.32 | 3.87 | 13.35 |
| 75 | 5.30 | 8.32 | 26.90 |
| 100 | 8.23 | 13.20 | >50.00 |

TABLE IX

Effect of pH and Perborate Concentration
Min. Flow Rate at 414 kPa

| pH | 0 g/L NaPB | 0.5 g/L NaPB | 5 g/L NaPB | 9.5 g/L NaPB |
|---|---|---|---|---|
| 5 | NM | 120 | 161 | 181 |
| 7 | 195 | 173 | 200 | 407 |
| 9 | NM | 156 | 586 | 424 |

TABLE X

Effect of Perborate on Different Clay Sample

| Volume (ml) | Min. Flow Rate at 552 kPa | |
|---|---|---|
| | Water | NaPB |
| 20 | 0.97 | 1.38 |
| 40 | 3.65 | 5.93 |
| 60 | 8.10 | 9.57 |
| 80 | 13.69 | 21.08 |

TABLE XI

Effect of Perborate Concentration Using Different Clay Sample

| Volume (ml) | Min. Flow Rate at 414 kPa | | | |
|---|---|---|---|---|
| | 0.0 g/L NaPB | 0.1 g/L NaPB | 0.25 g/L NaPB | 0.5 g/L NaPB |
| 20 | 1.33 | 1.20 | 1.15 | 1.33 |
| 40 | 4.48 | 4.05 | 4.00 | 4.48 |
| 60 | 9.27 | 8.40 | 8.32 | 9.23 |

TABLE XI-continued

Effect of Perborate Concentration Using Different Clay Sample

| Volume (ml) | Min. Flow Rate at 414 kPa | | | |
|---|---|---|---|---|
| | 0.0 g/L NaPB | 0.1 g/L NaPB | 0.25 g/L NaPB | 0.5 g/L NaPB |
| 80 | 15.55 | 14.12 | 14.12 | 15.55 |

We claim:

1. A process for distributing a peroxygen through particulate matter containing clay without swelling the clay comprising incorporating a compound selected from the group consisting of a salt of a perborate or a persulfate anion into water to form an aqueous solution absent a colloidal agent to impart a high viscosity, and introducing the aqueous solution into the particulate matter containing clay.

2. The process of claim 1 wherein the particulate matter containing clay is soil.

3. The process of claim 1 wherein the particulate matter containing clay is a heap of mineral ore.

4. The process of claim 1 wherein the particulate matter containing clay is a mineral deposit.

5. The process of claim 1 wherein the salt is sodium perborate.

6. The process of claim 1 wherein the salt is potassium perborate.

7. The process of claim 1 wherein the salt is sodium persulfate.

8. The process of claim 1 wherein the salt is potassium persulfate.

9. A process for distributing a peroxygen through contaminated particulate matter containing clay to stimulate the biodegradation of the contaminant without swelling the clay comprising incorporating a compound selected from the group consisting of a salt of a perborate or a persulfate anion into an aqueous solution absent a collodial agent to impart a high viscosity, and introducing the aqueous solution into the contaminated particulate matter containing clay.

10. The process of claim 9 wherein the particulate matter containing clay is soil.

11. The process of claim 9 wherein the particulate matter containing clay contains aerobic microorganisms.

12. The process of claim 9 wherein the particulate matter containing clay is contaminated with a petroleum product.

13. The process of claim 9 wherein the salt is sodium perborate.

14. The process of claim 9 wherein the salt is potassium perborate.

15. The process of claim 9 wherein the salt is sodium persulfate.

16. The process of claim 9 wherein the salt is potassium persulfate.

17. A process for distributing a peroxygen through soil containing clay to stimulate the biooxidation of a petroleum product contaminant without swelling the clay comprising incorporating a compound selected from the group consisting of sodium perborate, sodium persulfate, potassium perborate and potassium persulfate into an aqueous solution absent a colloidal agent to impart a high viscosity, and introducing the aqueous solution into the contaminated soil.

* * * * *